(12) United States Patent
Kriz et al.

(10) Patent No.: US 8,783,283 B2
(45) Date of Patent: Jul. 22, 2014

(54) HEATING DEVICE FOR VALVE TO PREVENT INTERNAL ACCUMULATION OF CONDENSATE

(75) Inventors: Davor Kriz, Baden (CH); Tobias Zieger, Eschenz (CH); Peter Baumann, Weisendangen (CH); Muhamed Murati, Wettingen (CH)

(73) Assignee: Control Components, Inc., Rancho Santa Margarita, CA (US)

( * ) Notice: Subject to any disclaimer, the term of this patent is extended or adjusted under 35 U.S.C. 154(b) by 123 days.

(21) Appl. No.: 13/362,692

(22) Filed: Jan. 31, 2012

(65) Prior Publication Data
US 2013/0192677 A1    Aug. 1, 2013

(51) Int. Cl.
*F16K 49/00*    (2006.01)
(52) U.S. Cl.
USPC .......................................................... 137/334
(58) Field of Classification Search
USPC .................................. 137/334, 341; 219/641
See application file for complete search history.

(56) References Cited

U.S. PATENT DOCUMENTS

| | | | | |
|---|---|---|---|---|
| 1,333,558 A | * | 3/1920 | Minor | 219/206 |
| 2,704,085 A | * | 3/1955 | Wadsworth et al. | 137/81.1 |
| 3,617,699 A | * | 11/1971 | Othmer | 392/469 |
| 6,227,236 B1 | * | 5/2001 | Kusumoto et al. | 137/341 |
| 6,494,229 B2 | * | 12/2002 | Kajitani | 137/530 |
| 2007/0151528 A1 | | 7/2007 | Hedman | |
| 2009/0077961 A1 | | 3/2009 | Baker | |
| 2010/0077986 A1 | | 4/2010 | Chen | |

OTHER PUBLICATIONS

International Search Report and Written Opinion for PCT/US13/22555. Issued Apr. 19, 2013.

\* cited by examiner

*Primary Examiner* — John K Fristoe, Jr.
*Assistant Examiner* — Kevin E Lynn
(74) *Attorney, Agent, or Firm* — Stetina Brunda Garred & Brucker

(57) ABSTRACT

In accordance with the present invention, there is provided a valve assembly wherein a heating modality such as an induction heater is cooperatively engaged to a prescribed location on a valve housing or body of a valve to effectively maintain the temperature of the valve above the saturation temperature of the related system pressure. Maintaining this temperature differential effectively avoids the accumulation of condensate within the interior of the valve body and/or on other internal structural features thereof.

12 Claims, 2 Drawing Sheets ial. In this regard, it is contemplated that the heating device can be retrofitted to existing valves in the field with minimal modifications thereto.

HEATING DEVICE FOR VALVE TO PREVENT INTERNAL ACCUMULATION OF CONDENSATE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to valves and, more particularly, to a valve assembly wherein a heating modality or device is cooperatively engaged to a prescribed location on a valve housing or body of a valve to effectively maintain the temperature of the valve above the saturation temperature of the related system pressure for purposes of avoiding the accumulation of condensate in the interior of the valve body and/or on other internal structural features thereof.

2. Description of the Related Art

A common application for the use of industrial control valves is steam control. In this regard, steam control valves are generally considered to be one the most basic and indispensible components of steam systems. In many process applications, steam control valves not only control pressure, but also temperature. Additionally, steam control valves can be used simply as an on and off device, or any combination of controlling to include regulation, modulation, mixing, or even isolation.

Many currently known steam control valves work in accordance with an operational principle wherein they are closed in normal operating conditions and under working pressure. In this state, medium pressure acts on the piston of the valve in a manner maintaining the valve in a closed position or condition. In these types of valves, an ancillary device such as a pilot valve is often used to open a discharge path which facilitates the release of steam out of the valve piston chamber of the valve. The steam release resulting from the opening of the pilot valve, and the resultant reduction in the pressure acting on the valve piston (which otherwise maintains it in the closed position), facilitates the actuation of the valve to its open position or condition.

However, with regard to steam control valves which operate using the discharging principle, there is a tendency for such valves to develop condensate on the inner or interior surfaces of the valve body, within the piston chamber, and/or on other internal structural features thereof. Though in the prior art it is known to insulate the aforementioned steam control valves, the formation of the condensate still typically results since the valve cannot be ideally insulated, with insulation imperfections typically resulting in an escape of heat from the valve. When this occurs and the valve temperature falls to or below the saturation line or temperature of the related system pressure, the heating of the valve by the steam itself results in the above-described condensate formation within the valve. Another cause of condensate formation is attributable to transients pertaining to valve temperature. In this regard, since steam control valves are typically very large and heavy, the valve temperature, which is usually connected to internal pressure, will not immediately follow the pressure change, but rather will remain at an established level for a longer period of time. This occurrence often results in the generation of condensate, since if a change in the valve temperature does not immediately follow a pressure change, the valve temperature will usually fall below the aforementioned saturation line.

The formation of water or condensate on the interior surfaces of the valve body, within the piston chamber, and/or on other internal structural features of the valve gives rise to certain valve performance penalties. More particularly, the condensate adds to the volume (compared to steam only) which needs to be released by the discharge path opened by the pilot valve, thus decreasing the opening time of the valve. In this regard, once the discharge path is opened, the water/condensate evaporates and consequently a much larger steam volume needs to be discharged, compared to the state that would otherwise exist if only steam was present in the piston chamber in accordance with the normal operational parameters of the valve. The present invention addresses and overcomes this particular problem by providing a valve assembly which is provided with a modality to facilitate the heating of the valve in a manner prohibiting the generation of condensate, thus keeping the valve internals free of condensate and avoiding the performance penalties attributable thereto. These, as well as other features and attributes of the present invention, will be discussed in more detail below.

BRIEF SUMMARY OF THE INVENTION

In accordance with the present invention, there is provided a valve assembly wherein a heating modality or device is cooperatively engaged to a prescribed location on a valve housing or body of a valve to effectively maintain the temperature of the valve above the saturation temperature of the related system pressure. Maintaining this temperature differential effectively avoids the accumulation of condensate within the interior of the valve body and/or on other internal structural features thereof.

More particularly, within the specific context of the piloted steam control valves described above, heating the valve so as to maintain the temperature thereof above the saturation line at a given pressure prevents condensate formation as a result of the metal temperature of the valve being higher than the steam temperature. By preventing condensate formation, the above-described discharge path of the steam control valve can be accurately defined and optimized based on the anticipated volume of steam, thus avoiding design uncertainties attributable to a potential unknown mixture of water and steam arising from condensate formation within the valve.

An exemplary heating device which may be used in the valve assembly of the present invention is a conventional induction heater. It is contemplated that such heater may be provided in a variety of shapes and sizes, with such shape/size being dependent upon the structural attributes of the corresponding valve, and in particular the valve body thereof. In this regard, it is contemplated that the size and shape of the heating device will be selected such that the activation thereof after being cooperatively engaged to the valve body will result in the effective heating of those portions of the valve body and the internal structural features thereof which are most critical to avoid the formation of condensate. The heating solution provided in accordance with the present invention may be used in conjunction with medium activated valves, isolation valves, safety valves, etc. which function in accordance with a conventional discharging principle. The heating solution can also be used for existing valves in the field in which the excessive build-up of condensate is problematic, or in in the form of an upgrade, and may further be implemented in new valve constructions.

The present invention is best understood in reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
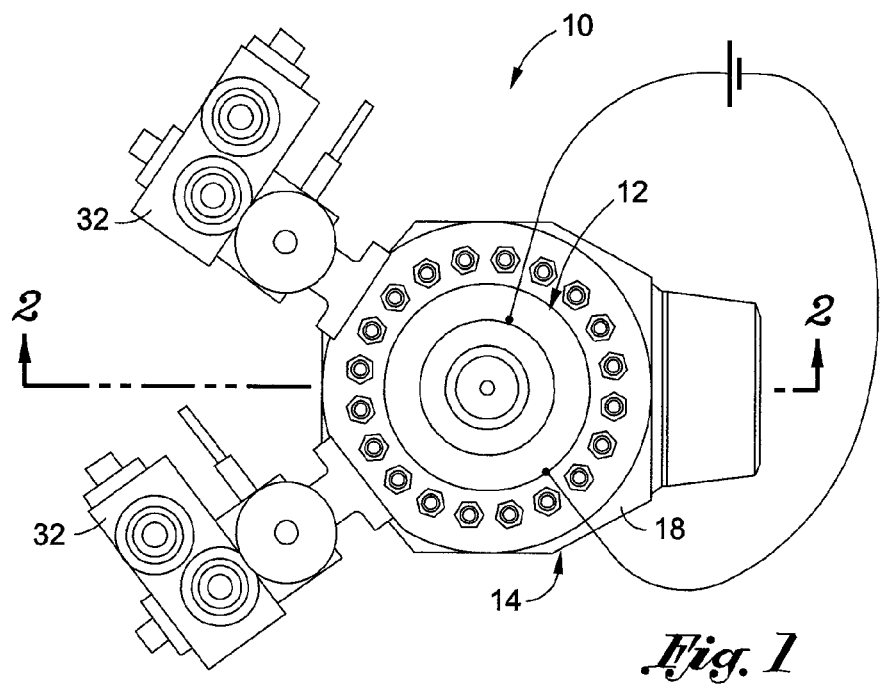
FIG. 1 is a top plan view of an exemplary valve assembly constructed in accordance with the present invention.
Figure 2:
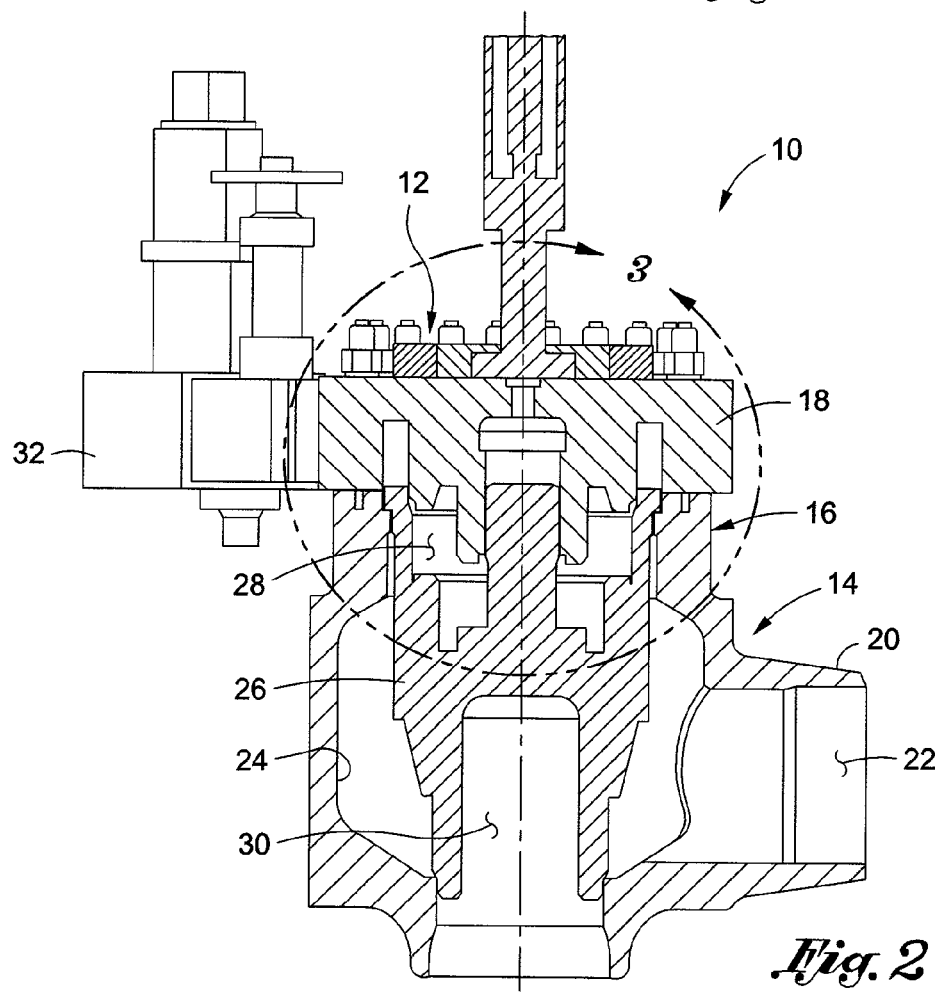
FIG. 2 is a cross-sectional view taken along line 2-2 of FIG. 1.
Figure 3:
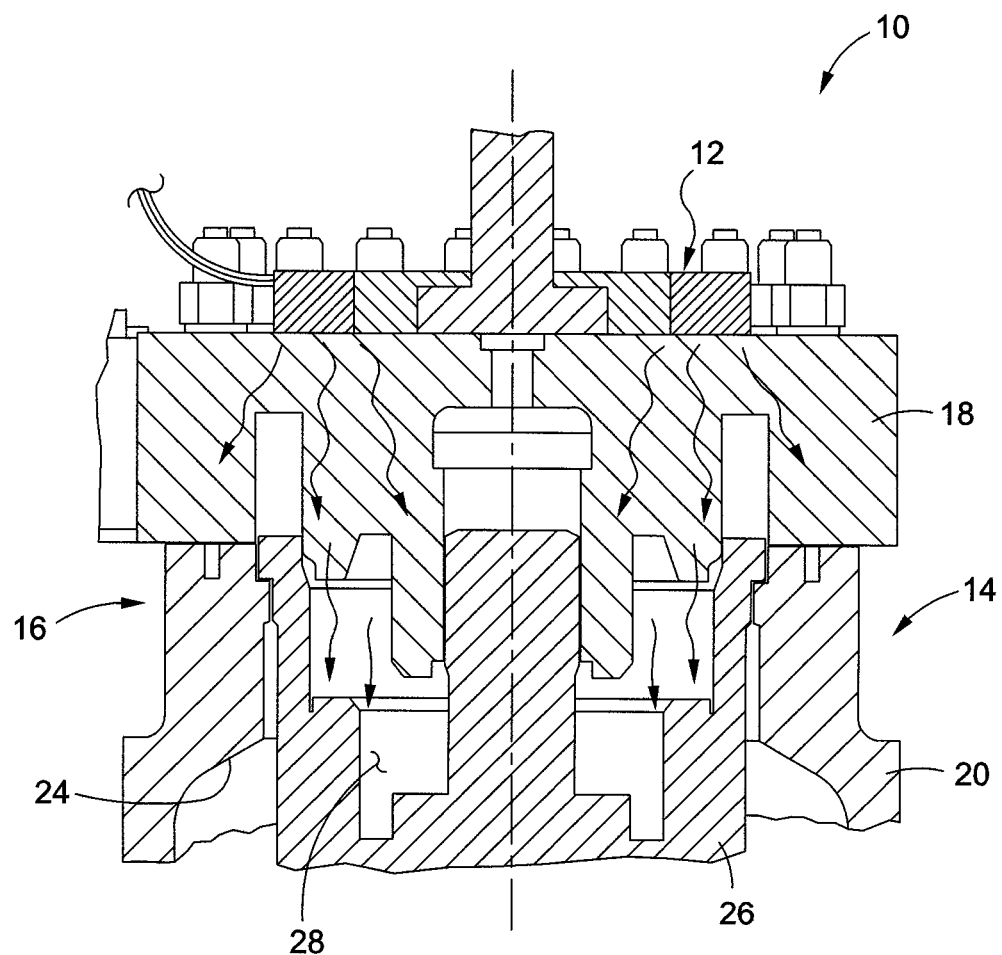
FIG. 3 is an enlargement of the encircled region 3 shown in FIG. 2.

Referring now to the drawings wherein the showings are for purposes of illustrating a preferred embodiment of the present invention only, and not for purposes of limiting the same, FIGS. 1-3 depict a valve assembly 10 constructed in accordance with the present invention. The valve assembly 10 comprises a heating device 12 which is operatively coupled to an exemplary valve 14. As will be described in more detail below, the shape of the heating device 12 and positioning thereof upon the valve 14 are selected so as that the activation of the heating device 12 maintains the valve 14 at a temperature level above the saturation temperature of the related system pressure to effectively avoid the accumulation of condensate within the interior of the valve body and/or on other internal structural features of the valve 14.

The exemplary valve 14 integrated into the valve assembly 10 of the present invention is preferably a medium activated valve such as an isolation valve or a safety valve, and operates in accordance with what is commonly referred to as the "discharging principle." In this regard, as indicated above, a common problem with valves which operate in accordance with the discharging principle and are used in steam control systems is the inevitable build up of condensate on the interior surfaces of the valve body of the valve, and/or other internal structure features thereof.

The exemplary valve 14 comprises a valve housing or body 16 which, from the perspective shown in FIGS. 2 and 3, includes an upper body section 18 and a lower body section 20. The lower body section 20 of the valve body 16 defines a primary flow passage 22 through the valve body 16. As best seen in FIG. 2, the inlet and outlet ends of the flow passage 22 and the main valve body chamber positioned therebetween are each defined by portions of the interior surface 24 of the lower body section 20. The valve body 16, and in particular the upper and lower body sections 18, 20 thereof, is typically fabricated from a metal material.

In addition to the valve body 16, the valve 14 includes a valve piston 26, the majority of which resides within the main valve body chamber of the flow passage 22. The valve piston 26 is selectively moveable between a closed position (shown in FIG. 2) wherein it is operative to block the flow of fluid (e.g., steam) between the inlet and outlet ends of the flow passage 22. The valve piston 26 is moveable from its closed position to an open position whereat the inlet and outlet ends of the flow passage 22 are placed into fluid communication with each other via the main valve body chamber of the flow passage 22. When viewed from the perspective shown in FIG. 2, the valve piston 26 defines an upper valve piston chamber 28 and a lower valve piston chamber 30. Like the valve body 16, the valve piston 26 is typically fabricated from a metal material.

Though not shown with particularity in FIGS. 2-3, the valve 14, as being an exemplary medium activated valve operating in accordance with the discharging principle, is further outfitted with a flow passage which communicates the upstream pressure flowing therein via the inlet end of the fluid passage 22 into the upper valve piston chamber 28. Though the upstream pressure is also introduced into the lower valve piston chamber 30 and tries to push the valve piston 26 from its closed position shown in FIG. 2 to its open position, such movement to the open position is opposed by that same pressure which, as indicated above, is also routed to the upper valve piston chamber 28. In this regard, the area of the valve piston 26 exposed to the upstream pressure in the upper valve piston chamber 28 is larger than that area of the valve piston 26 exposed to the upstream pressure in the lower valve piston chamber 30, thus resulting in the valve piston 26 effectively being maintained in its closed position.

As seen in FIGS. 1 and 2, the valve 14 includes at least one, and preferably a pair of pilot valves 32 which are cooperatively engaged to the valve body 16. The pilot valves 32 are operative to selectively vent or exhaust the upper valve piston chamber 28 to either the downstream, outlet end of the flow passage 22 or to atmosphere. As will be recognized, the opening of the pilot valves 32 as facilitates the venting or exhausting of the upper valve piston chamber 28 causes the pressure level in the upper valve piston chamber 28 to fall below that within the lower valve piston chamber 30, thus facilitating the actuation of the valve piston 26 from its closed position shown in FIG. 2 to its open position. More particularly, the fluid or steam pressure within the upper valve piston chamber 28 is exhausted to either the downstream, outlet end of the flow passage 22 or to atmosphere via one or more discharge paths (not shown) of the valve 14 which extend through the valve body 16 and are effectively routed through the pilot valves 32 as allows the discharge path(s) to be selectively opened and closed thereby.

Those of ordinary skill in the art will recognize that the valve 14 will typically include other structural features in addition to the valve body 16, valve piston 26, pilot valves 32, and the various flow and discharge paths or passages described above. For example, additional internal structural features of the valve 14 may include, but are not limited to, biasing springs, seals, packing elements, etc. In this regard, as also indicated above, the structural features of the valve 14 as described above are intended to serve as only one example of a medium activated valve such as an isolation valve or safety valve which operates under the discharging principle. Thus, those of ordinary skill in the art will further recognize that the valve 14 may be provided in any one of a plurality of configurations differing from those described above without necessarily departing from the spirit and scope of the present invention.

A preferred, contemplated use for the valve assembly 10 constructed in accordance with the present invention is within a steam control system. As previously explained, in steam control systems, all valves (such as the valve 14) which operate using the discharging principle tend to get condensate within the interior of the valve body and/or on the internal structural features thereof. Though the valves within the steam control system are typically insulated, the formation of the condensate still occurs as a result of insulation imperfections, which gives rise to an escape of heat and a condition wherein the steam itself heats up the valve, thus causing the temperatures of the valve body and internal structural features thereof to fall below the saturation temperature of the steam pressure within the system. As also explained above, another cause of condensate formation is attributable to transients pertaining to valve temperature. In this regard, since steam control valves are typically very large and heavy, the valve temperature, which is usually connected to internal pressure, will not immediately follow the pressure change, but rather will remain at an established level for a longer period of time. This occurrence often results in the generation of condensate, since if a change in the valve temperature does not immediately follow a pressure change, the valve temperature will usually fall below the aforementioned saturation line.

Within a valve having the basic structural features of the valve 14 as described above, the condition wherein the temperature of the valve body 16 and at least the valve piston 26 fall below the saturation temperature within the steam control system will typically result in water or condensate forming on the interior surface 24 of the lower body section 20 of the valve body 16 and within at least the upper valve piston chamber 28 of the valve piston 26. Once the discharge path is opened by the actuation of the pilot valves 32 in the aforementioned manner, the water/condensate within the interior of the valve body 16, and in particular within the upper valve piston chamber 28 of the valve piston 26, evaporates, with the consequence being that a much bigger volume of steam needs to be discharged to either atmosphere or the downstream, outlet end of the flow passage 22 before the pressure within the upper valve piston chamber 28 is lowered to a point wherein the valve piston 26 is capable of being actuated to its open position. In this regard, it is the decrease in the pressure in the upper valve piston chamber 28 attributable to the opening of the discharge path which causes the condensate or water to evaporate. The need to discharge the larger volume of steam to exhaust or vent the upper valve piston chamber 28 typically results in undesirable, longer opening times for the valve 14.

The heating device 12 integrated into the valve assembly 10 is particularly adapted to improve the operability of the valve 14 in a steam control environment by decreasing the opening time thereof. In this regard, the decrease in the opening time is attributable to the heating device 12 effectively maintaining the temperature of the valve 14, and in particular the valve body 16 and valve piston 26 thereof, constantly above the saturation temperature of the related steam system pressure, thus effectively avoiding the accumulation of water or condensate on the interior surface 24 of the lower body section 20 of the valve body 16, within the upper valve piston chamber 28 of the valve piston 26, and upon other internal structural features of the valve 14.

As seen in FIGS. 1-3, the particular heating device 12 integrated into the valve assembly 10 preferably has an annular, ring-like configuration. Additionally, when viewed from the perspective shown in FIGS. 2 and 3, the heating device 12 is positioned upon the generally planar top surface of the upper body section 18 of the valve body 16. FIG. 3 includes a number of arrows which depict the flow of heat from the activated heating device 12 to and through the valve body 16, and to the internal structural features of the valve 14, and notably the valve piston 26 thereof. Advantageously, by maintaining the metal temperature of at least the valve body 16 and valve piston 26 of the valve 14 higher than that of the steam temperature and above the saturation line at any given pressure, no condensate will form on the interior surface 24 or within the upper valve piston chamber 28, thereby avoiding the penalties which would otherwise arise in relation to the time needed to facilitate the movement of the valve piston 26 from its closed position to its open position upon the opening of the discharge path by the pilot valves 32 to exhaust the steam pressure from within the upper valve piston chamber 28 of the valve piston 26.

In the valve assembly 10, the size and shape of the heating device 12 as shown in FIGS. 1-3, and the particular position thereof on the valve body 16, are selected so as to optimize the ability of the heating device 12 to maintain both the valve body 16 and the internal structural features thereof (notably the valve piston 26) at a temperature higher than that of the saturation temperature of the steam within the valve 14 at a given pressure. However, since the configuration of the valve 14 is intended to be exemplary only, those of ordinary skill in the art will recognize that for a valve having structural features differing from those described above in relation to the valve 14, any heating device cooperatively engaged thereto to prevent condensate formation therein in the aforementioned manner may have a size and/or shape differing from that of the aforementioned heating device 12, and may further be positioned on such valve in any one of a multiplicity of differing locations, such location being selected to optimize the transmission of heat from the heating device to the valve body and internal structural features of such valve. Along these lines, within the valve assembly 10, it is contemplated that the heating device 12 may be disposed on locations of the valve body 16 other than for the upper body section 18 thereof. For example, the heating device 12 could potentially be directly engaged to the lower body section 20 without departing from the spirit and scope of the present invention.

The ultimate objective in relation to the size, shape and location of the heating device 12 upon the valve 14 is that the heat generated by the heating device 12 will radiate symmetrically through the valve body 16 and into the internal structural features thereof (including the valve piston 26), as opposed to the heat generated by the heating device 12 being applied to only one part or portion of the valve 14. Further, the capacity of the heating device 12 is preferably selected so that it is operative to maintain the temperature of the valve 14, and notably the valve body 16 and valve piston 26 thereof, in the range of about 5° to about 15° F. above the saturation temperature of the steam system pressure.

In the valve assembly 10, it is contemplated that the heating device 12 will be provided with a supply of electrical power (e.g., AC and/or DC) as shown in FIG. 1. Further, it is contemplated that within the valve assembly 10, the heating device 12 will be maintained in a powered, activated state at all times. In this regard, due to the valve body 16, valve piston 26 and other components or structural features of the valve 14 typically being of a very large size and weight, a constant state of activation of the heating device 12 is usually necessary to effectively maintain the temperature of the valve 14 above that of the saturation temperature of the steam flowing therein. However, it is further contemplated that the valve 14 could optionally be provided with various temperature sensors in a prescribed arrangement as allows for constant monitoring of the temperature of the valve body 16 and/or other structural features thereof as would potentially allow for the heating device 12 to be periodically cycled off, and reactivated when the temperature of the valve 14 falls below a prescribed temperature level which is still above the saturation temperature of the steam system pressure.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A valve assembly for use with a fluid in a prescribed pressure range and having a corresponding saturation temperature, the valve assembly comprising:
   a valve body defining a primary flow passage having an inlet end and an outlet end;
   a valve piston disposed within the valve body and selectively movable along a piston axis between a closed position wherein the piston effectively blocks direct fluid flow from the inlet end to the outlet end of the flow passage, and an open position wherein fluid is able to flow over the piston directly from the inlet end to the outlet end; and
   a heating device cooperatively engaged to the valve body and operative to radiate heat along and radially outward from the piston axis to maintain at least the valve body and the valve piston at a prescribed temperature level which exceeds the saturation temperature of the fluid;
   wherein the heating device is provided in a size, shape, and location on the valve body such that the activation of the heating device is operative to maintain at least the valve body and the valve piston at a temperature which is in the range of about 5° F. to about 15° F. above the saturation temperature of the fluid.

2. The valve assembly of claim 1 wherein the heating device is an electrically powered induction heater.

3. The valve assembly of claim 1 wherein the heating device has a generally annular configuration defining an outer circumference smaller than an outer circumference of the valve body and is positioned on the valve body to circumvent at least one other structural feature of the valve.

4. The valve assembly of claim 1 wherein:
   the valve piston defines at least one piston chamber;
   the valve body includes at least one discharge path which communicates with the piston chamber;
   the valve includes at least one pilot vale which is operative to selectively vent the piston chamber via the discharge path; and
   the heating device is provided in a size, shape, and location on the valve body such that the activation of the heating device is operative to prevent the formation of condensate in at least the piston chamber of the valve piston.

5. The valve assembly of claim 4 wherein the heating device has a generally annular configuration and is positioned on t e valve body to circumvent at least one other structural feature of the valve.

6. In a valve assembly for use with a fluid in a prescribed pressure range and having a corresponding saturation temperature, and including at least a valve body and a valve piston movably disposed within the valve body along a piston axis, the improvement comprising:
   a heating device cooperatively engaged the valve body and operative to radiate heat along and radially outward from the piston axis to maintain at least the valve body and the valve piston at a prescribed temperature level which exceeds the saturation temperature of the fluid;
   wherein the heating device is provided in a size, shape, and location on the valve body such that the activation of t e heating device is operative to maintain at least the valve body and the valve piston at a temperature which is in the range of about 5° F. to about 15° F. above he saturation temperature of the fluid.

7. The valve assembly of claim 6 wherein the heating device is an electrically powered induction heater.

8. The valve assembly of claim 6 wherein the heating device a generally annular configuration and is positioned on the valve body to circumvent at least one other structural feature of the valve.

9. A method of preventing the formation of condensate within a valve for use with a fluid in a prescribed pressure range and having a corresponding saturation temperature, and including at least a valve body and a valve piston movably disposed within the valve body and moveable along a piston axis, the method comprising the steps of:
   (a) cooperatively engaging a heating device to the valve body; and
   (b) activating the heating device to radiate heat along and radially outward from the piston axis to maintain at least the valve body and the valve piston at a prescribed temperature level which exceeds the saturation temperature of the fluid;
   wherein step (a) comprises providing the heating device in a size, shape, and location on the valve body such that the activation of the heating device in step (b) is operative to maintain at least the valve body and the valve piston at a temperature which is in the range of about 5° F. to about 15° F. above the saturation temperature of the fluid.

10. The method of claim 9 wherein step (a) comprises cooperatively engaging the heating device to the valve body at a location wherein heat generated by the heating device is able to radiate symmetrically through the valve body and into the valve piston.

11. The method of claim 9 wherein step (a) comprises providing the heating device in a generally annular configuration and positioning it on the valve body to circumvent at least one other structural feature of the valve.

12. The method of claim 9 wherein step (a) comprises cooperatively engaging an electrically powered induction heater to the valve body.

* * * * *